United States Patent
Ooba et al.

(10) Patent No.: US 9,739,164 B2
(45) Date of Patent: Aug. 22, 2017

(54) VARIABLE NOZZLE FOR AERONAUTIC GAS TURBINE ENGINE

(71) Applicant: IHI Corporation, Koto-Ku (JP)

(72) Inventors: Yoshinori Ooba, Tokyo (JP); Yuta Matsumoto, Tokyo (JP); Takehiko Kimura, Tokyo (JP)

(73) Assignee: IHI Corporation, Koto-Ku (JP)

( * ) Notice: Subject to any disclaimer, the term of this patent is extended or adjusted under 35 U.S.C. 154(b) by 0 days.

(21) Appl. No.: 14/866,127

(22) Filed: Sep. 25, 2015

(65) Prior Publication Data

US 2016/0010489 A1   Jan. 14, 2016

Related U.S. Application Data

(63) Continuation of application No. PCT/JP2014/061978, filed on Apr. 30, 2014.

(30) Foreign Application Priority Data

May 15, 2013  (JP) .................................. 2013-102858

(51) Int. Cl.
*F02K 1/12* (2006.01)
*F01D 17/16* (2006.01)
(Continued)

(52) U.S. Cl.
CPC ............... *F01D 17/16* (2013.01); *F01D 9/02* (2013.01); *F01D 11/005* (2013.01); *F01D 25/30* (2013.01);
(Continued)

(58) Field of Classification Search
CPC ......... F02K 1/1223; F02K 1/06; F02K 1/1269
See application file for complete search history.

(56) References Cited

U.S. PATENT DOCUMENTS

| 4,176,792 A | 12/1979 | McCardle, Jr. |
| 5,201,800 A * | 4/1993 | Wolf ......................... F02K 1/15 239/265.19 |

(Continued)

FOREIGN PATENT DOCUMENTS

| JP | 54-019004 | 2/1979 |
| JP | 03-100359 A | 4/1991 |

(Continued)

OTHER PUBLICATIONS

International Search Report mailed Jul. 15, 2014 for PCT/JP2014/061978 filed Apr. 30, 2014 with English Translation.

(Continued)

*Primary Examiner* — Pascal M Bui Pho
*Assistant Examiner* — Stefan Ibroni
(74) *Attorney, Agent, or Firm* — Oblon, McClelland, Maier & Neustadt, L.L.P.

(57) ABSTRACT

A variable nozzle is comprised of: an exhaust duct vectoring a flow of the exhaust gas to the aft end; a plurality of primary flaps arranged to define a primary flow path converging toward the aft end, each of the primary flaps being swingably pivoted on the exhaust duct to regulate a degree of opening the primary flow path and including a first section and a second section forming an angle axially outward relative to the first section; and a plurality of secondary flaps arranged to define a secondary flow path in communication with the primary flow path, the secondary flow path being capable of divergent toward the aft end, the secondary flaps being respectively swingably pivoted on the second sections of the primary flaps to regulate a degree of opening the secondary flow path.

8 Claims, 9 Drawing Sheets

(51) Int. Cl.
  *F01D 9/02* (2006.01)
  *F01D 11/00* (2006.01)
  *F01D 25/30* (2006.01)
(52) U.S. Cl.
  CPC ........ *F02K 1/1223* (2013.01); *F05D 2220/32* (2013.01); *F05D 2240/128* (2013.01); *F05D 2240/55* (2013.01)

(56) References Cited

U.S. PATENT DOCUMENTS

| | | | |
|---|---|---|---|
| 5,215,256 A | | 6/1993 | Barcza |
| 5,255,849 A | * | 10/1993 | Mayer .................. F02K 1/1223 239/127.3 |
| 5,779,152 A | * | 7/1998 | Renggli ................ F02K 1/1223 239/265.33 |
| 5,897,120 A | | 4/1999 | Scavo et al. |
| 6,195,981 B1 | * | 3/2001 | Hanley .................. F02K 1/008 239/265.35 |
| 2005/0217271 A1 | | 10/2005 | Peters |
| 2009/0072490 A1 | | 3/2009 | Cowan et al. |
| 2009/0090817 A1 | * | 4/2009 | Monka .................. F02K 1/1223 244/76 R |
| 2012/0255806 A1 | | 10/2012 | Pilon |
| 2013/0033005 A1 | | 2/2013 | Treat et al. |

FOREIGN PATENT DOCUMENTS

| | | |
|---|---|---|
| JP | 04-334749 A | 11/1992 |
| JP | 05-086979 A | 4/1993 |
| JP | 05-141310 A | 6/1993 |
| JP | 07-509037 A | 10/1995 |
| JP | 08-074660 A | 3/1996 |
| JP | 2002-147283 A | 5/2002 |
| JP | 2004-044589 A | 2/2004 |
| JP | 2005-030397 A | 2/2005 |
| JP | 2007-85334 A | 4/2007 |
| JP | 4081550 B2 | 2/2008 |

OTHER PUBLICATIONS

International Written Opinion mailed Jul. 15, 2014 for PCT/JP2014/061978 filed Apr. 30, 2014.
Office Action issued on Jun. 21, 2016 in Japanese Patent Application No. 2015-517026.

\* cited by examiner

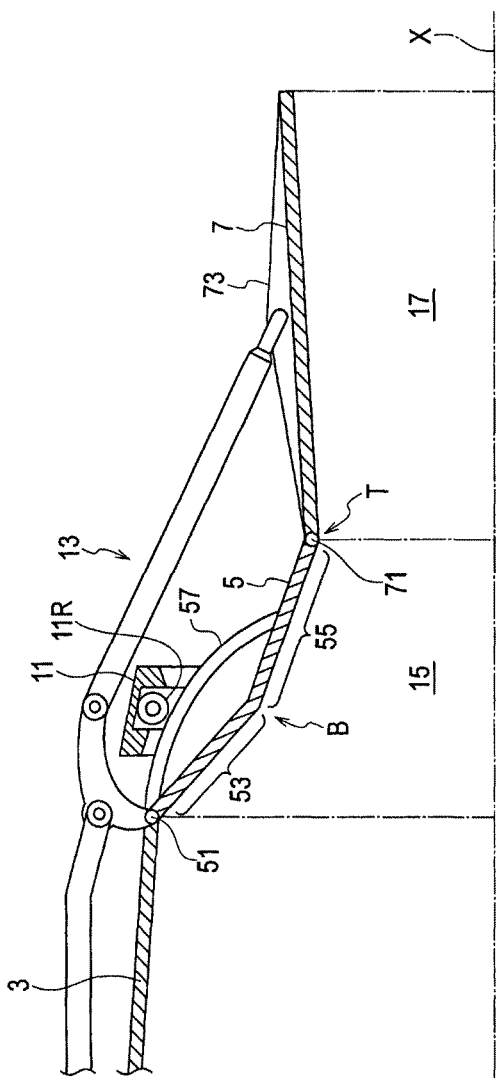

VARIABLE NOZZLE FOR AERONAUTIC GAS TURBINE ENGINE

CROSS-REFERENCE TO RELATED APPLICATIONS

This application is a Continuation Application of PCT International Application No. PCT/JP2014/061978 (filed Apr. 30, 2014), which is in turn based upon and claims the benefit of priority from Japanese Patent Application No. 2013-102858 (filed May 15, 2013), the entire contents of which are incorporated herein by reference.

BACKGROUND

Technical Field

The disclosure relates to a variable nozzle for an aeronautic gas turbine engine and in particular relates to a variable nozzle capable of reducing loss in thrust thereof.

Description of the Related Art

An exhaust nozzle of an aeronautic gas turbine engine has a function of rectifying and ejecting exhaust gas rearward and, as well, a function of regulating its flow velocity. In a case where the gas turbine engine is operated only within a subsonic speed range, usually used is a so-called convergent nozzle that converges toward the downstream direction in order to increase the velocity of the exhaust gas flow. In a case where the gas turbine engine is also operated beyond the sonic speed, frequently used is a so-called convergent-divergent nozzle that once converges the exhaust gas flow and thereafter, downstream of a throat, expands the flow. A convergent-divergent nozzle may be constructed as a variable nozzle that variates the aperture areas of the throat and the exhaust exit respectively in order to optimize its efficiency over a wide range of speed. The literatures listed below disclose related arts of variable nozzles.

Japanese Patent Application Laid-open No. H05-141310
Japanese Patent Application Laid-open No. S54-19004
Japanese Patent Application Laid-open No. H04-334749
Japanese Patent Application Laid-open No. H03-100359

Variable nozzles require extremely high thermal resistance as they are directly exposed to high-temperature exhaust gas. Materials that can meet such a requirement of thermal resistance are, in general, poorly workable and are therefore available only for producing members with simple shapes such as flat panels. Thus, generally, a plurality of flaps and a plurality of seals, respectively formed into flat shapes, are combined to produce a variable nozzle. Experts frequently carry out numerical analysis of flow fields of exhaust gas to determine ideal flow path shapes and then determine dimensions and arrangement of flat flaps and flat seals so as to approximate these ideal flow path shapes.

CITATION LIST

Patent Literature

SUMMARY

Because real flaps and real seals are flat as described above, the shape of the flow path defined thereby slightly differs from the ideal shape determined by the numerical analysis. This difference had been ignored because it was considered to make no substantial difference in performance to actual machines. According to studies by the present inventors, however, it became apparent that this difference causes shock wave structures and may cause non-negligible loss in generated thrust.

The present inventors have studied anew numerical analysis based on flat shapes and thereby reached the subject disclosed herein.

According to an aspect, a variable nozzle, which is used for ejecting exhaust gas of an aeronautic gas turbine engine along its axis from a fore end toward an aft end, is comprised of: an exhaust duct vectoring a flow of the exhaust gas to the aft end; a plurality of primary flaps arranged to define a primary flow path converging toward the aft end, each of the primary flaps being swingably pivoted on the exhaust duct to regulate a degree of opening the primary flow path and including a first section and a second section forming an angle axially outward relative to the first section; and a plurality of secondary flaps arranged to define a secondary flow path in communication with the primary flow path, the secondary flow path being capable of divergent toward the aft end, the secondary flaps being respectively swingably pivoted on the second sections of the primary flaps to regulate a degree of opening the secondary flow path.

BRIEF DESCRIPTION OF DRAWINGS

FIG. 2 is a longitudinal sectional view of the variable nozzle according to the present embodiment.

DETAILED DESCRIPTION OF THE EXEMPLARY EMBODIMENTS

Exemplary embodiments will be described hereinafter with reference to the appended drawings. It is particularly noted that these drawings are not always drawn to scale exactly and therefore dimensional relations among elements are not limited to those shown therein.

Throughout the following descriptions and the appended claims, unless otherwise described, directional expressions such as forward, front, fore, rearward, rear and aft are based on the direction of the engine and the aircraft.

Figure 1:
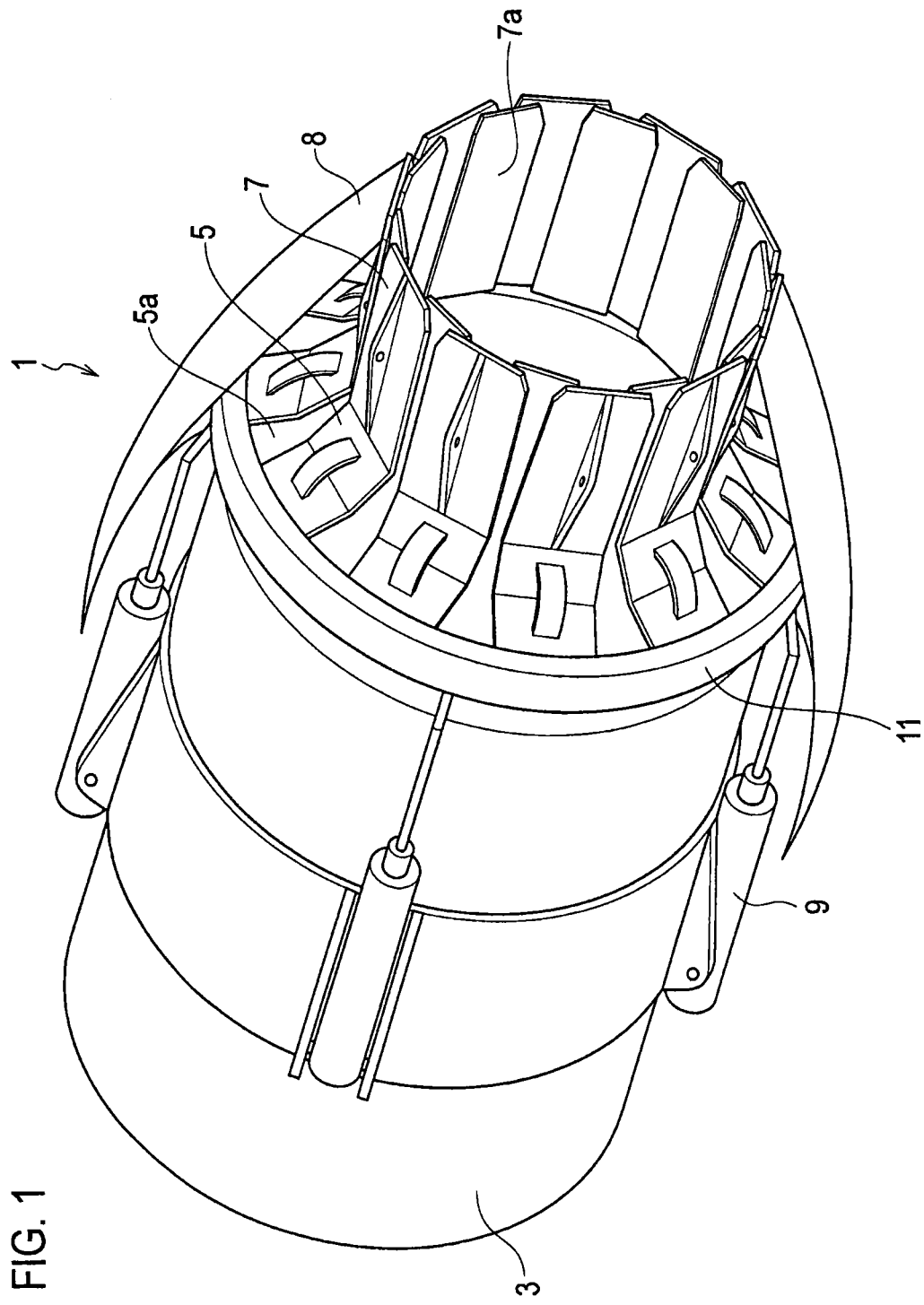
FIG. 1 is a perspective view of a variable nozzle for an aeronautic gas turbine engine according to an embodiment, which is viewed from an oblique position closer to its aft end.

FIG. 1 is a perspective view of a variable nozzle 1 for an aeronautic gas turbine engine according to the present embodiment, which is viewed from its aft end. For the convenience of illustrating its internal structure, an outer flap 8 covering primary flaps 5 and secondary flaps 7 is drawn to be partly cut out and also linkages 13 for driving the primary flaps 7 are not drawn in FIG. 1. FIG. 2 is a longitudinal sectional view showing an exhaust duct 3, the primary flap 5, the secondary flap 7, a ring structure 11 for driving the primary flap 5, and the linkage 13 for driving the primary flap 7 of the variable nozzle 1.

Referring FIG. 2 in combination with FIG. 1, the variable nozzle 1 is in general comprised of the exhaust duct 3, the plurality of primary flaps 5, and the plurality of secondary flaps 7. The exhaust duct 3 is in fluid communication with a rear end of the main body of the engine and vectors its exhaust in the direction from the fore end to the aft end along an axis X. To the rear end of the exhaust duct 3 connected is the plurality of primary flaps 5 respectively and further to respective rear ends thereof connected is the plurality of secondary flaps 7. These flaps are arranged circumferentially to define a flow path for the exhaust gas flow.

Respective gaps among the primary flaps 5 are blocked by primary seals 5a that get in contact with, and follow movements of, these primary flaps 5. Respective gaps among the secondary flaps 7 are blocked by secondary seals 7a in a similar way. The exhaust gas flow therein is thereby prevented from leaking out and flows along the axis X toward the exit of the nozzle.

Figure 3A:
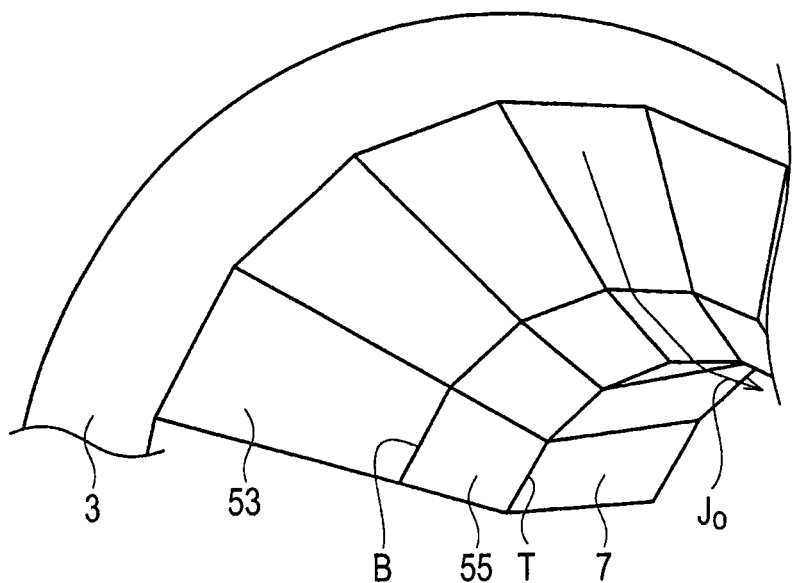
FIG. 3A is a partial perspective view of a part of an exemplary variable nozzle, which is viewed from an oblique position closer to its aft end.

Referring mainly to FIG. 2 and FIG. 3A, the plurality of primary flaps 5 and the plurality of primary seals 5a are arranged circumferentially to define a primary flow path 15. Although the primary seals 5a are in FIG. 3A hidden behind the primary flaps 5 because this drawing shows a state where the variable nozzle 1 is narrowed, it could be possible that they are exposed even in the narrowed state. Or, the plurality of primary seals 5a may be almost always exposed inward.

Each primary flap 5 is, at its front end, pivoted on the exhaust duct 3 by means of a joint 51, thereby being capable of regulating its degree of opening. Each primary flap 5 is comprised of a first section 53 at its front, and a second section 55 unitarily continuous to the first section 53. The first section 53 and the second section 55 are respectively flat, and the second section 55, at a flexure section B, forms an angle radially outward (in a direction where the convergence is loosed or changed into a divergence) relative to the first section 53. Each primary seal 5a may be constructed in a similar way and is similarly pivoted on the exhaust duct 3.

The plurality of secondary flaps 7 and the plurality of secondary seals 7a are arranged circumferentially to define a secondary flow path 17, which is in fluid communication with the primary flow path 15. Each secondary flap 7 is in general of a flat shape, and is pivoted on the second section 55 of the primary flap 5 by means of a joint 71, thereby being capable of regulating its degree of opening. Each secondary seal 7a may be constructed in a similar way and is similarly pivoted on each primary seal 5a.

An exhaust gas flow J0 is forced to converge during passing through the primary flow path 15, thereby being compressed, and in exchange has a rise in temperature. The length of the primary flow path 15 is so determined that the exhaust gas flow J0 at a throat T comes to be about the sonic speed. The exhaust gas flow J0 in the secondary flow path 17 adiabatically expands and thereby accelerates further, thereby being capable of flowing beyond the sonic speed.

The boundary between the primary flaps 5 and the secondary flaps 7 functions as the throat T as the narrowest section in the flow path. Further, as described later in more detail, the flexures of the primary flaps 5 can function as another throat depending on the degrees of opening the primary flaps 5 and the secondary flaps 7. The present disclosure will often refer this flexure section B as a pre-throat. The exhaust gas flow J0 is bent at the flexure section B and further bent at the throat T.

In the example illustrated in FIG. 3A, both the first section 53 and the second section 55 are formed to be flat over the full width thereof but the flatness may not span the full width. As in the example shown in FIG. 3B, the first section 53 and the second section 55 may be put between a pair of slopes S. While the flexure section B in this example may be narrower than that in the above-described example, the effect of vectoring the exhaust gas flow J0 is similar. Further, as in the example shown in FIG. 3C, the pair of slopes S may be mutually in contact at the flexure section B. While the flexure section B in this example is a vertex of the first section 53, the second section 55, and the pair of slopes S, the effect of vectoring the exhaust gas flow J0 is similar.

Figure 3B:
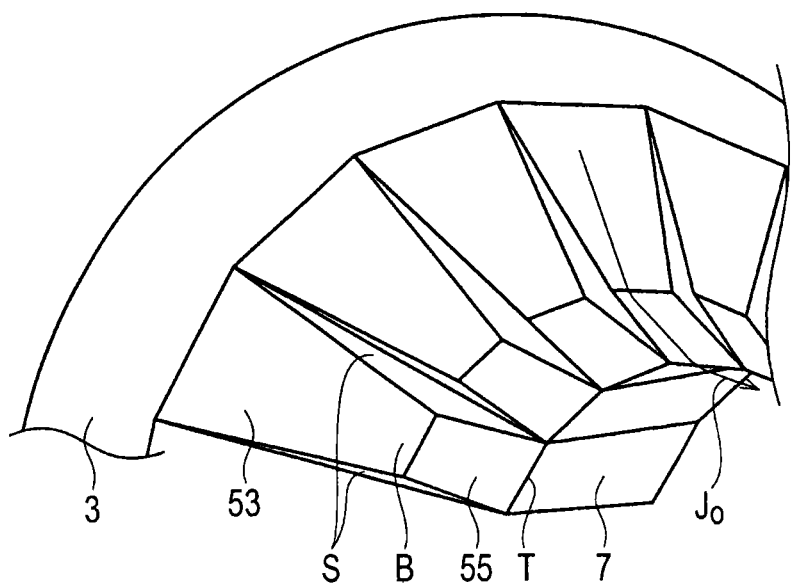
FIG. 3B is a partial perspective view of a part of another exemplary variable nozzle, which is viewed from an oblique position closer to its aft end.
Figure 3C:
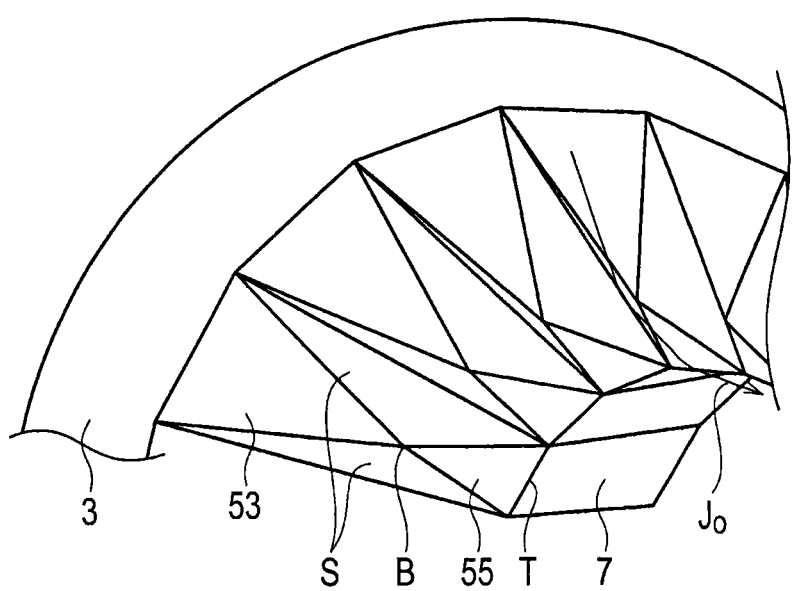
FIG. 3C is a partial perspective view of a part of still another exemplary variable nozzle, which is viewed from an oblique position closer to its aft end.

The primary seals 5a in the examples shown in FIGS. 3B and 3C may be formed to be flat. As bases of the pair of slopes S are linear, when the variable nozzle 1 is made opened or closed, the seals 5a can be steadily made close contact with the flat primary flaps 5.

Referring mainly to FIG. 1, the variable nozzle 1 is comprised of any proper driver means so as to regulate the degrees of opening the primary flaps 5 and the secondary flaps 7. Each of these driver means is for example comprised of an actuator 9, the ring structure 11 and the linkage 13.

The actuator 9 is for example a hydraulically driven piston, and a plunger extended from the piston is coupled with the ring structure 11 to drive it back and forth. Referring mainly to FIG. 2, the ring structure 11 is so disposed as to make its internal surface slide on the back of the primary flap 5, and is preferably comprised of a roller 11R to allow smooth slide. Meanwhile the plunger coupled with the ring structure 11 is not in sight in FIG. 2 because the plunger runs in a plane different from the plane shown in the drawing.

Each primary flap 5 is, corresponding to the ring structure 11, comprised of a cam follower structure 57, which has a curved shape like as an arc. As the ring structure 11 moves back or forth on the cam follower structure 57, the primary flap 5 correspondingly swings around the joint 51. Response by the primary flap 5 to the back and forth motion of the ring structure 11 depends considerably on the shape of the cam follower structure 57.

The linkage 13 is driven in conjunction with, or independently from, the ring structure 11. More specifically, another actuator independent of the actuator 9 may be provided for the purpose of driving the linkage 13. The tip of the linkage 13 is rotatably coupled with a backing structure 73 of the primary flap 7. As the linkage 13 moves back or forth, the secondary flap 7 swings around the joint 71.

The driver means as described above are no more than examples but may be replaced with any other proper constitutions.

Figure 4A:
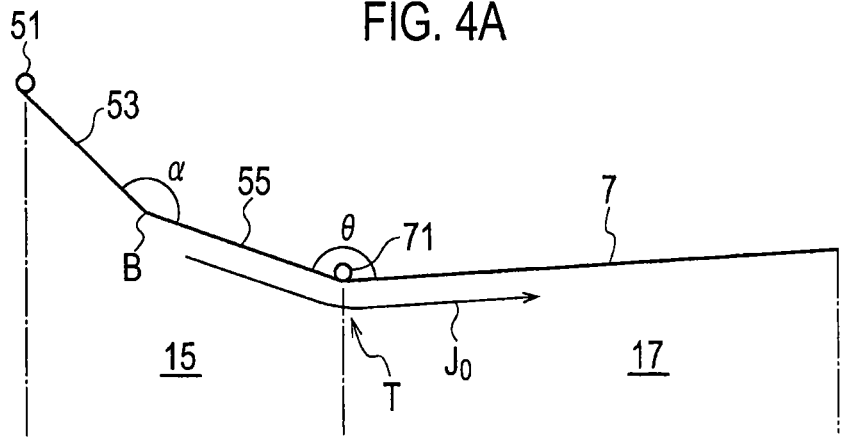
FIG. 4A is a schematic longitudinal sectional view of the variable nozzle according to the present embodiment, which shows a state where the variable nozzle is narrowed.

As described above, while the degrees of opening the primary flap 5 and the secondary flap 7 may be changed, in a state where the degrees are relatively small, they may fall in a position relation shown in FIG. 4A. More specifically, the primary flow path 15 defined by the primary flaps 5, as a whole, converges toward the aft end. An angle alpha between the first section 53 and the second section 55, even in this state, has a sufficient angle to make the second section 55 converge toward the aft end. An angle theta between the primary flap 5 and the secondary flap 7, also even in this state, is sufficiently small to make the secondary flow path 17 defined by the secondary flap 7 converge toward the aft end.

Based on numerical analyses, to the throat optimally applicable is a rounded shape continuously transient from a divergent shape to a convergent shape. According to the conventional art, both the convergent flap and the divergent flap are flat, its throat therebetween, slightly differently from such an ideal shape, makes an angular curve. This difference consequently generates a shock wave structure in the exhaust gas flow downstream of the throat, which causes non-negligible loss in thrust. This effect will be later described in more detail.

Figure 4B:
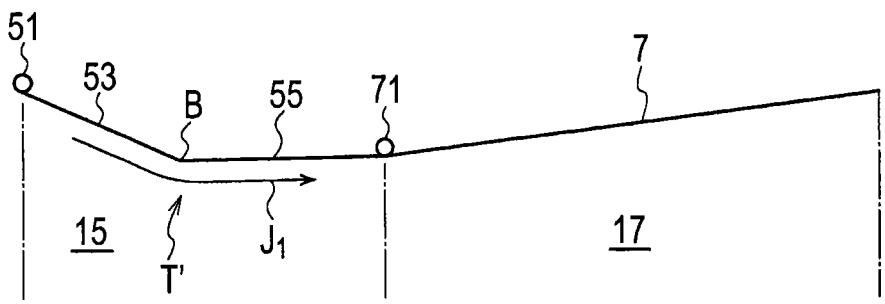
FIG. 4B is a schematic longitudinal sectional view of the variable nozzle according to the present embodiment, which shows a state where the variable nozzle is widened.

The angle alpha may be so determined as to allow the primary flap 5 and the secondary flap 7 to fall in a position relation shown in FIG. 4B in the course of opening both of them to the greater degrees. More specifically, the angle alpha may be so determined that, at least when the primary flow path 15 is opened at the maximum degree, the second section 55 of the primary flap 5 can be parallel to the axis X or slightly divergent. The flexure section B, on behalf of the boundary between the primary flap 5 and the secondary flap 7, functions as a throat T'. The exhaust gas flow J1 is forced to converge until passage through the throat T' and thereafter expands to reach the ultrasonic speed. Depending on the operation condition of the engine, there may be a case where compression prior to the throat requires only a small travel distance, or a case where a longer distance is advantageously required for expansion downstream of the throat. The embodiment shown in FIG. 4B is advantageous in changeability of the position of the throat.

Figure 4C:
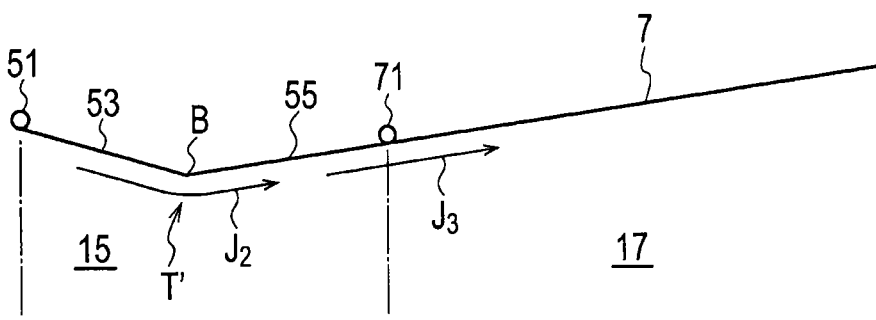
FIG. 4C is a schematic longitudinal sectional view of the variable nozzle according to the present embodiment, which shows a state where the variable nozzle is further widened.

More preferably the angle alpha may be so determined as to allow the flaps to fall in a position relation shown in FIG. 4C when the primary flap 5 is opened sufficiently wide. More specifically, the angle alpha may be so determined that, at least when the primary flow path 15 is opened at the maximum degree, the second section 55 of the primary flap 5 can be substantially in line with the secondary flap 7. As the exhaust gas flow J2 can, after passing through the throat T', linearly expand as shown in the arrow J2, loss in thrust is unlikely to occur.

Effects produced by the present embodiment will be studied hereinafter with reference to FIGS. 5 through 9.

Figure 5A:
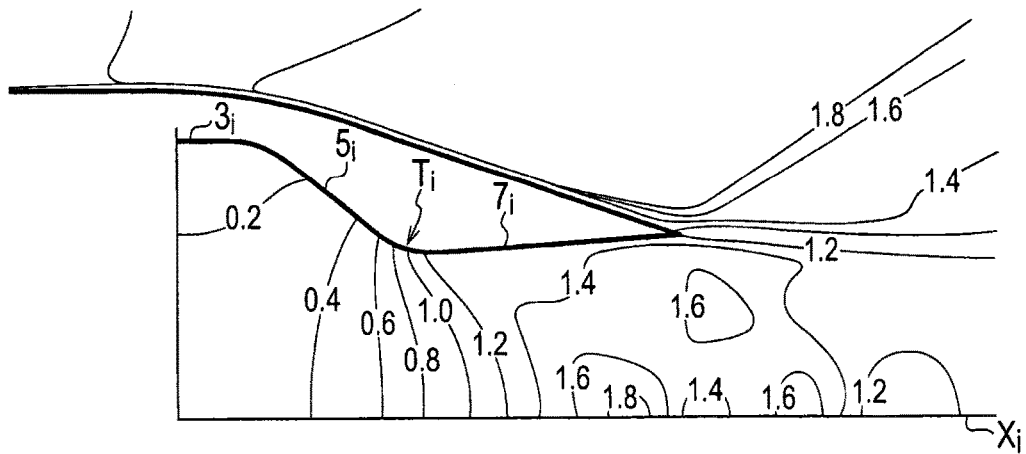
FIG. 5A shows an example of results of analysis about a field of flow in a variable nozzle according to an ideal shape.
Figure 5B:
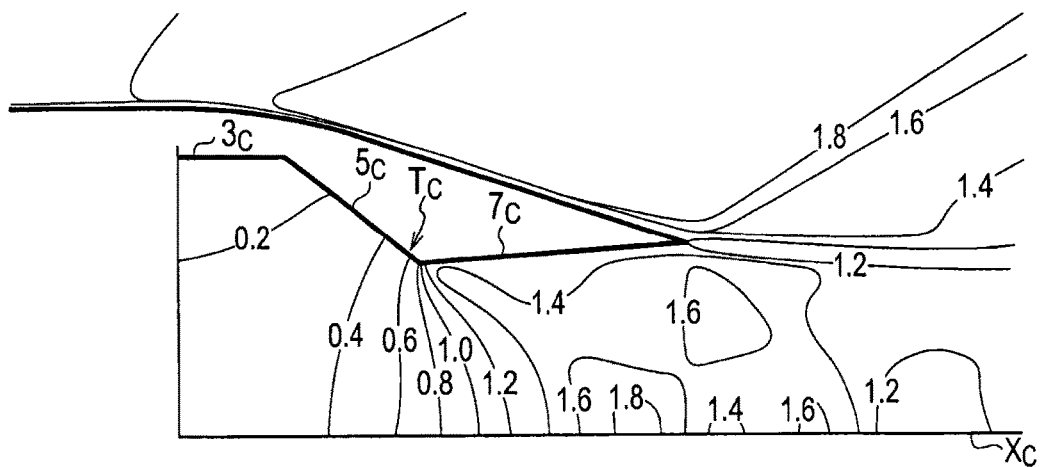
FIG. 5B shows an example of results of analysis about a field of flow in a variable nozzle having flat flaps.
Figure 5C:
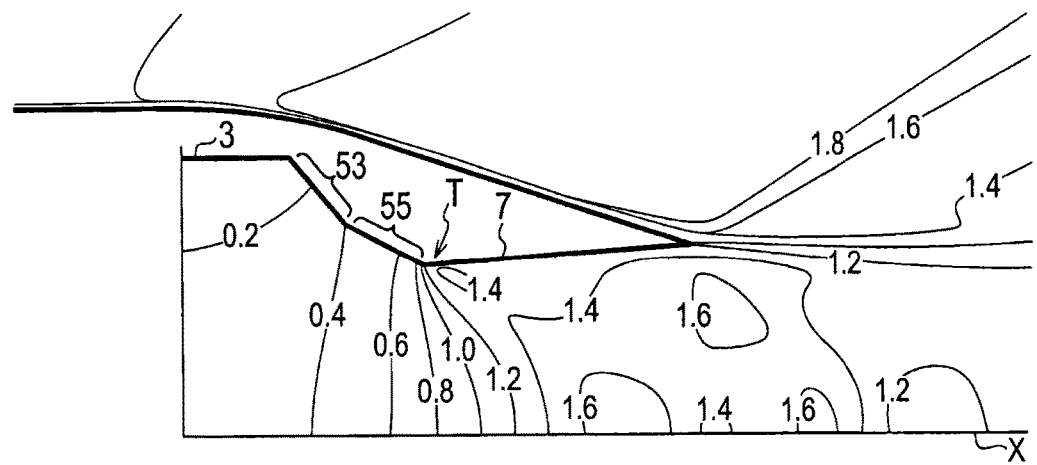
FIG. 5C shows an example of results of analysis about a field of flow in the variable nozzle according to the present embodiment.

FIGS. 5A through 5C show examples of results of CFD analyses based on dimensions and flow rates of a real engine, where FIG. 5A is a result about an ideally shaped nozzle Id that is consistent with an ideal shape determined by a numerical analysis, where FIG. 5B is a result about a nozzle C in which a combination of flat flaps approximates the ideal shape, and where FIG. 5C is a result about the variable nozzle 1 of the present embodiment. In these drawings in common, flow speeds at respective regions are shown by isokinetic contours and numerals in the drawings represent Mach numbers.

Referring to FIG. 5A, even in the ideal shape, the exhaust duct 3, the primary flap 5i and the secondary flap 7i are respectively generally flat but respective boundaries among them make continuously transient curves. In particular, the throat Ti makes a smooth curve. The flow speeds are relatively low at the depth of the exhaust duct 3i. The flow thereafter expands by the divergent secondary flap 7i to exceed the sonic speed, and then reaches about Mach 1.5 around the exit of the nozzle.

When paying attention to regions along the axis Xi, somewhat upstream of the exit of the nozzle, the flow slightly exceeds Mach 1.8, and, somewhat downstream, slows down below Mach 1.4. Further downstream, regions over Mach 1.6 and regions below Mach 1.2 alternately appear in a row. More specifically, even the ideal shape cannot avoid generation of a shock wave structure. It is known that, if the shock wave structure develops well, it will cause thrust loss and will, in an extreme case, exert a bad influence on combustion in the engine.

Referring to FIG. 5B, in the conventional art, both the primary flap 5c and the secondary flap 7c are flat and therefore boundaries among the exhaust duct 3c, the primary flap 5c and the secondary flap 7c make angular curves. Also in results of this case, a flow speed about Mach 1 around the throat Tc and a flow speed about Mach 1.5 around the exit of the nozzle are acknowledged. When comparing with FIG. 5A, it is particularly emphasized that a region over Mach 1.8, somewhat upstream of the exit of the nozzle along the axis Xc, becomes prominent. Although it may not be well comprehensible from the drawing, the fastest point in this region reaches about Mach 2. More specifically, the shock wave structure will develop well according to the conventional art.

Referring to FIG. 5C, in the present embodiment, even regions somewhat upstream of the exit of the nozzle along the axis X do not produce a region over Mach 1.8 and further downstream regions undergo more moderate increases and decreases in the flow speed. More specifically, the shock wave structure is moderated.

Figure 6:
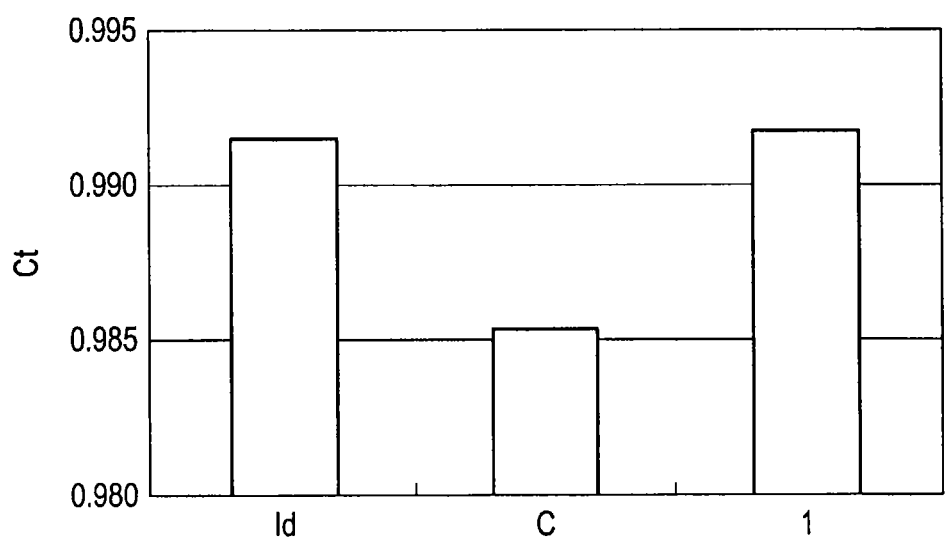
FIG. 6 is a graph comparing thrust coefficients.

Values of thrust coefficients Ct (1 if no loss) obtained by these CFD analyses are compared in FIG. 6. While the thrust coefficient Ct of the nozzle C constituted of flat panels is about 0.985, the variable nozzle 1 of the present embodiment gives a higher Ct of 0.991. This is comparable with that of the ideal nozzle Id and therefore it is understood that the present embodiment produces a relatively small thrust loss.

Figure 7A:
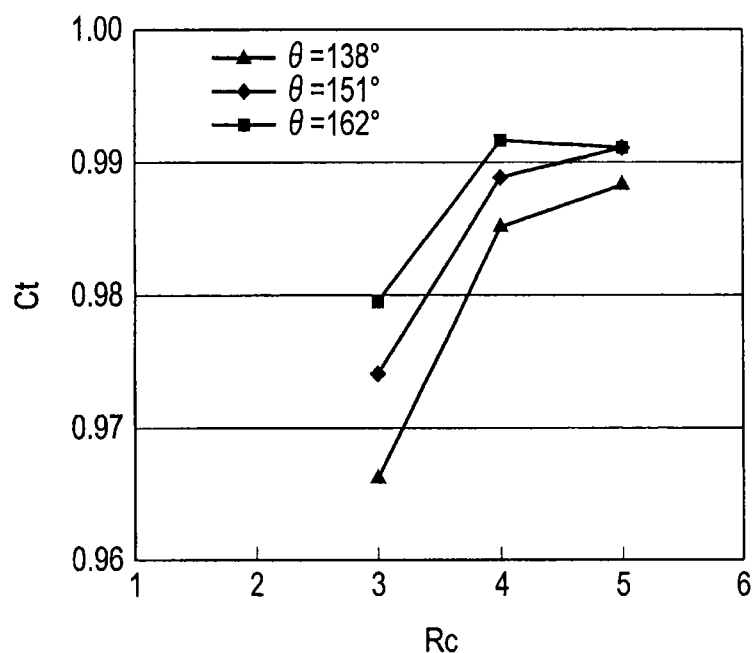
FIG. 7A is a graph comparing influences of angles between primary flaps and secondary flaps on the thrust coefficients.

FIG. 7A is a graph showing influences of angles theta between the second section 55 of the primary flap 5 and the secondary flap 7 on thrust coefficients Ct, on the basis of a case where the angle alpha between the first section 53 and the second section 55 of the primary flap 5 is set to be 132 degrees in the present embodiment. The horizontal axis represents a nozzle compression ratio Rc as a value of an aperture area of the primary flap 5 at the most upstream section divided by an aperture area of the throat T. There is found a tendency in which increase in angle theta from 138 degrees to 162 degrees results in increase in thrust coefficient Ct if Rc is in the range of 3 to 5. Increase in nozzle compression ratio Rc, independent of the angle theta, results in increase in thrust coefficient Ct (small thrust loss) if the nozzle compression ratio Rc is in the range of 3 to 4. If the nozzle compression ratio Rc is in the range of 4 to 5, increase in nozzle compression ratio Rc results in increase in thrust coefficient Ct if the angle theta is in the range of 138 degrees to 151 degrees, but this effect may be saturated if the angle theta is any angle over 151 degrees, at least 162 degrees. On the basis of these results, the angle theta is preferably equal to or more than 138 degrees, and more preferably equal to or more than 151 degrees and equal to or less than 162 degrees.

Figure 7B:
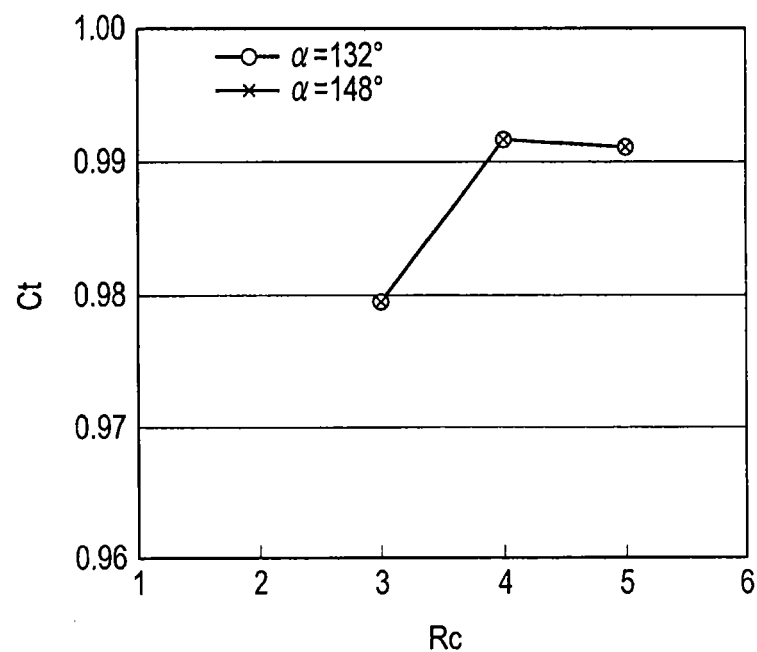
FIG. 7B is a graph comparing influences of angles of a pre-throat on the thrust coefficients.

FIG. 7B is a graph showing influences of angles alpha between the first section 53 and the second section 55 of the primary flap 5 on thrust coefficients Ct as the angle theta between the second section 55 of the primary flap 5 and the secondary flap 7 is fixed to be 162 degrees. In any case, the thrust coefficients Ct are greater (smaller in thrust loss) than those in a case of flat primary flaps (corresponding to a case of alpha=180 degrees). On the other hand, there may be no difference in the thrust coefficients Ct as compared between the cases where the angle alpha is 132 degrees and where the angle alpha is 148 degrees. More specifically, the effect of suppressing the thrust loss is apparent at least in this angle range. Thus the angle alpha is preferably less than 180 degrees and at least within any angle range including the range of 132 degrees to 148 degrees.

Figure 8:
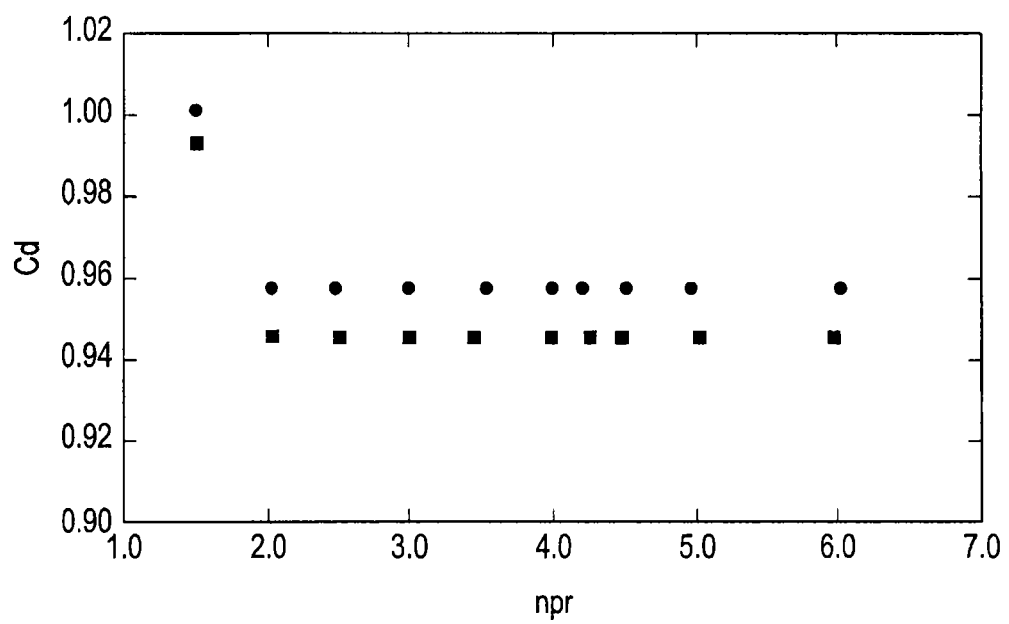
FIG. 8 is a graph illustrating flow rate properties of the variable nozzle according to the present embodiment.

FIG. 8 is a graph comparing the flow rate coefficients Cd, where the horizontal axis represents a nozzle pressure ratio (a ratio of a nozzle internal pressure to the atmospheric pressure) npr. Solid circles represent values of the variable nozzle of the present embodiment and solid rectangles represent values of a variable nozzle without a pre-throat. In any nozzle compression ratios aside from about 1.5, the variable nozzle of the present embodiment is higher in flow rate coefficient Cd and its difference delta-Cd is about 0.012. More specifically, the flow rate is expected to be increased by about 1.2%.

Figure 9:
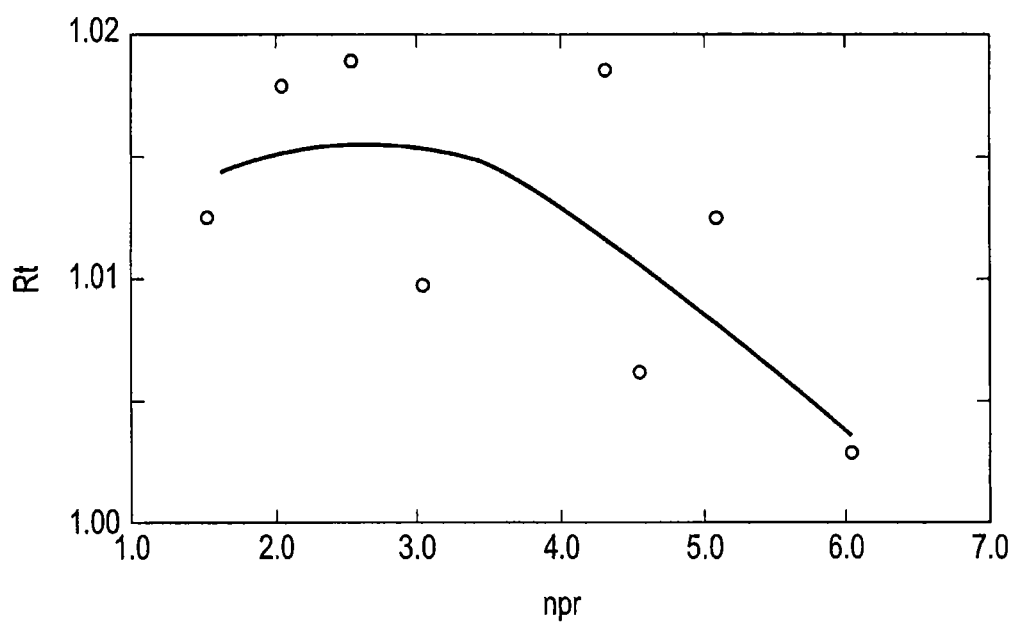
FIG. 9 is a graph illustrating thrust properties of the variable nozzle according to the present embodiment.

FIG. 9 is a graph of a thrust ratio Rt of a thrust by the variable nozzle of the present embodiment to the variable nozzle without the pre-throat, where the horizontal axis similarly represents a nozzle pressure ratio npr. In any nozzle pressure ratios, the variable nozzle of the present embodiment produces higher thrust and increase in thrust is nearly 2%.

Although certain embodiments have been described above, modifications and variations of the embodiments described above will occur to those skilled in the art, in light of the above teachings.

INDUSTRIAL APPLICABILITY

A variable nozzle for an aeronautic gas turbine engine, which can suppress thrust loss, is provided.

What is claimed is:

1. A variable nozzle used for ejecting exhaust gas of an aeronautic gas turbine engine along an axis from a fore end toward an aft end, comprising:
an exhaust duct vectoring a flow of the exhaust gas to the aft end;
a plurality of primary flaps arranged to define a primary flow path converging toward the aft end, each of the primary flaps being swingably pivoted on the exhaust duct to regulate a degree of opening of the primary flow path and each of the primary flaps including a first section and each of the primary flaps including a second section, wherein the first section and second section are linear and intersecting such that an angle of 132 degrees or greater and less than 180 degrees is formed between an outer surface of the first section and an outer surface of the second section, wherein an inner surface of the first section and an inner surface of the second section both define the primary flow path and are radially inwards of the outer surface of the first section and the outer surface of the second section respectively relative to the axis, the inner surface of the first section and the inner surface of the second section are linear and are connected continuously such that the inner surface of the first section is directly adjacent to the inner surface of the second section;
a plurality of secondary flaps arranged to define a secondary flow path in communication with the primary flow path, the secondary flow path being capable of divergent toward the aft end, the plurality of secondary flaps being respectively swingably pivoted on the second section of a corresponding primary flap of the plurality of primary flaps to regulate a degree of opening of the secondary flow path, wherein the first section and the second section in each of the primary flaps form a flexure and are immovable relative to each other; and
wherein the plurality of primary flaps is upstream of the plurality of secondary flaps.

2. The variable nozzle of claim 1, wherein the first sections and the second sections are so dimensioned as to have the second sections divergent toward the aft end when the plurality of primary flaps swing to maximize the degree of opening of the primary flow path.

3. The variable nozzle of claim 1, wherein the first sections and the second sections of each of the primary flaps are so dimensioned as to make each of the flexures between the first sections and the second sections act as a throat for the flow of the exhaust gas when the plurality of primary flaps swing to increase the degree of opening of the primary flow path.

4. The variable nozzle of claim 1, further comprising:
a plurality of seals respectively in contact with the plurality of primary flaps and the plurality of secondary flaps to follow movement of the plurality of primary flaps and the plurality of secondary flaps so as to prevent the flow of the exhaust gas from leaking out.

5. The variable nozzle of claim 1, wherein the second section of each of the primary flaps is substantially in line with a corresponding secondary flap of the plurality of secondary flaps.

6. The variable nozzle of claim 1, further comprising a driver system for regulating the degree of opening of the primary flow path and the degree of opening of the secondary flow path, the driver system including an actuator, a ring structure, and a linkage, wherein the actuator is coupled to the ring structure, an internal surface of the ring structure slides on a back of one of the plurality of primary flaps, and the linkage is coupled with a backing structure of one of the plurality of secondary flaps such that movement of the linkage causes the one of the plurality of secondary flaps to pivot around a joint between one of the second sections and the one of the plurality of secondary flaps.

7. The variable nozzle according to claim 6, wherein the back of the one of the primary flaps presents a cam follower structure which is arcuate, and movement of the ring structure on the cam follower structure causes the one of the plurality of primary flaps to pivot around a joint between the exhaust duct and the one of the plurality primary flaps.

8. The variable nozzle according to claim 6, wherein the ring structure includes a roller.

* * * * *